(12) United States Patent
Scopic et al.

(10) Patent No.: US 8,931,963 B2
(45) Date of Patent: Jan. 13, 2015

(54) PLUG-IN CONNECTOR

(75) Inventors: Nesa Scopic, Herisau (CH); Patrick Zaina, Gossau (CH); Laif Gadmer, Uzwil (CH)

(73) Assignee: Huber+Suhner AG, Herisau (CH)

( * ) Notice: Subject to any disclaimer, the term of this patent is extended or adjusted under 35 U.S.C. 154(b) by 0 days.

(21) Appl. No.: 13/877,258

(22) PCT Filed: Sep. 27, 2011

(86) PCT No.: PCT/EP2011/066749
§ 371 (c)(1),
(2), (4) Date: Apr. 1, 2013

(87) PCT Pub. No.: WO2012/041840
PCT Pub. Date: Apr. 5, 2012

(65) Prior Publication Data
US 2013/0183007 A1  Jul. 18, 2013

(30) Foreign Application Priority Data

Oct. 1, 2010 (CH) ........................................ 1603/10

(51) Int. Cl.
*G02B 6/36* (2006.01)
*G02B 6/38* (2006.01)

(52) U.S. Cl.
CPC ................ *G02B 6/36* (2013.01); *G02B 6/3851* (2013.01); *G02B 6/3887* (2013.01)
USPC ........................................... 385/78; 385/139

(58) Field of Classification Search
CPC .. G02B 6/3893; G02B 6/3849; G02B 6/3887; G02B 6/3897; G02B 6/4292; G02B 6/4471; G02B 6/266; G02B 6/32; G02B 6/3546; G02B 6/3598; G02B 6/36; G02B 6/3636; G02B 6/3652; G02B 6/3692; G02B 6/3807; G02B 6/3821; G02B 6/3829; G02B 6/3843; G02B 6/3851; G02B 6/3869; G02B 6/3871; G02B 6/4214; G02B 6/423; G02B 6/4249; G02B 6/4478; G02B 1/043; H01R 13/6272; H01R 13/633
USPC ............. 385/76, 78, 139, 77, 100, 33, 53, 56, 385/60, 69, 86, 88
See application file for complete search history.

(56) References Cited

U.S. PATENT DOCUMENTS

| 5,461,690 | A | 10/1995 | Lampert |
| 6,178,283 | B1 * | 1/2001 | Weigel ........................ 385/139 |
| 6,206,581 | B1 * | 3/2001 | Driscoll et al. ................ 385/78 |

(Continued)

FOREIGN PATENT DOCUMENTS

| EP | 1 091 226 A1 | 4/2001 | |
| EP | 1091226 A1 * | 4/2001 | ............... G02B 6/38 |
| EP | 1 199 584 A1 | 4/2002 | |

(Continued)

*Primary Examiner* — Peter Radkowski
(74) *Attorney, Agent, or Firm* — Pauley Petersen & Erickson

(57) ABSTRACT

The invention relates to a plug-in connector for connecting at least one conductor, in particular a conductor cable with an optical conductor, comprising a main body (2) having a continuous opening, a tube-like conductor holder (3) and an anti-kink element (4). The conductor holder (3) is arranged at least partially inside the main body and movably mounted therein. The anti-kink element (4) protrudes at least partially over the main body (2). A spring element (5) is provided for positioning the conductor relative to the main body (2) and is clamped between the conductor holder (3) and the anti-kink element (4).

16 Claims, 2 Drawing Sheets

(56) References Cited

U.S. PATENT DOCUMENTS

| | | | |
|---|---|---|---|
| 6,293,710 B1 * | 9/2001 | Lampert et al. | 385/78 |
| 7,234,879 B2 * | 6/2007 | Schrodinger | 385/89 |
| 2002/0081077 A1 | 6/2002 | Nault | |
| 2004/0197055 A1 * | 10/2004 | Fischer et al. | 385/92 |
| 2011/0008003 A1 * | 1/2011 | Tamekuni et al. | 385/72 |

FOREIGN PATENT DOCUMENTS

| | | |
|---|---|---|
| WO | WO 2009/107306 A1 | 9/2009 |
| WO | WO 2009107306 A1 * | 9/2009 |

* cited by examiner

PLUG-IN CONNECTOR

BACKGROUND OF THE INVENTION

1. Field of the Invention

The invention is in the field of plug-in connectors for the connection of at least one conductor, in particular in the field of plug-in connectors for conductor cabling with an optical conductor.

2. Discussion of Related Art

Plug-in connectors are known from the state of the art in order to be able to connect conductors, such as, for example, an optical conductor to a device or to another conductor or to be able to join them to the same. For this purpose, the plug-in connector can be releasably plugged into a further plug-in connector, or by means of a coupling, can be plugged-in on a device or another conductor with which the connection is to be made. In particular in the case of optical conductors, precise positioning of the conductor inside a plug-in connection is necessary in order to ensure a perfect optical transmission. Even the smallest irregularities at a connection point can disturb or completely interrupt a transmission.

As a rule, a plug-in connector as claimed in the state of the art includes a sleeve-shaped basic body, in which is housed a conductor holder which holds a conductor, such as, for instance, an optical fiber conductor. The conductor holder consists, for example, of a ferrule with a ferrule holder which can align the ferrule inside the basic body. The optical fiber is housed for the most part in a flexible conductor cable. To produce the connection, the fiber is stripped from the cable and guided inside the ferrule. At a rear end of the plug-in connector, the conductor exits from the same and can be bent around the outside edge of the plug-in connector. In order to protect the conductor from kinking or breaking at said edge, the plug-in connector has an anti-kink element which surrounds the conductor in the outlet region out of the plug-in connector and prevents excessive bending around a small bending radius where the conductor could kink or break. For this purpose, a flexibly pliable region of the anti-kink element extends over the cable. The pliable region can be bent, but not kinked. The cable can thus be moved in a desired direction at the outlet out of the plug-in connector without the risk of damaging the cable at the same time. Such an anti-kink element is known, for example, from U.S. Pat. No. 5,461,690.

In order to ensure a secure connection of the conductor, the conductor holder is mounted so as to be movable in the axial direction inside the basic body and is prestressed by means of a spring into a feed position in which the conductor is pushed forward in the plug-in direction in relation to the basic body. The conductor can be displaced in relation to the basic body in opposition to the spring force into a plug-in position in opposition to the plug-in direction such that a compressive force which is necessary for producing a contact can be ensured and at the same time a secure conductor connection is made. To this end, the spring is slid over the conductor holder until it strikes against a stop edge on the conductor holder. Behind the spring, a counter spring piece is slid onto the conductor holder, said counter spring piece having a second stop edge for the spring. The counter spring piece is bonded or locked to the basic body. The cable end, from which the conductor held in the conductor holder exits, can be secured on the counter spring piece. In addition, the anti-kink element, as a separate part, connects to the counter spring piece and surrounds the conductor, or the cable with the conductor, once it exits from the plug-in connector. An unlocking element surrounds the basic body, the counter spring piece and part of the anti-kink element, said unlocking element being movable in relation to the basic body in order to trigger a locking process which secures the seat of the plug-in connector in the coupling. Such a plug-in connector is known, for example, from EP 1091226 B1 which shows a plug-in connector which is known as an LC connector.

During the production of a known plug-in connector, various individual components have to be fitted together. At the same time, however, only minimum positional deviations can be tolerated so that sufficient quality and precision for a good transmission is ensured. A large number of components have a disadvantageous effect on the overall installation size and the production process of the plug-in connector. There is an increased space requirement and additional functionalities become necessary such as, for instance, producing suitable component connections or ensuring precise positioning of the components with respect to one another.

SUMMARY OF THE INVENTION

It is the object of the present invention to create a simply designed plug-in connector which comprises few components, is short in size, produces a reliable plug-in connection, ensures sufficient protection of the conductor, does not require a lot of time and money to produce and has low production costs.

A plug-in connector for connecting at least one conductor as claimed in the present invention includes a basic body with a continuous opening, at least one tubular conductor holder and an anti-kink element. The conductor holder is arranged at least in part inside the basic body and is mounted in said basic body so as to be movable in the axial direction. The anti-kink element is arranged around a conductor and connects axially to the basic body or protrudes at least in part over the basic body. At least one spring element, which serves for positioning the conductor in relation to the basic body or for generating a contact force for connecting the conductor, is clamped between the conductor holder and the anti-kink element as claimed in the invention. Accordingly, the force flow of a force exerted by the spring onto the anti-kink element is directed via the anti-kink element onto the basic body. The basic body, in turn, can be releasably held in the coupling, for example by means of a locking system. The spring element preferably adjoins the basic body and the anti-kink element in a direct manner. As a rule, no further intermediate parts are necessary.

As claimed in the invention, the plug-in connector manages with only three basic components which are aligned with respect to one another and are positioned in relation to one another by means of the spring element. Essentially only two components are necessary for the secure guiding and bearing arrangement of the conductor holder as such. Consequently, compared to known plug-in connector systems, a smaller number of components are required for realizing a plug-in connector. Consequently, production costs are lower and production times are reduced. In addition, the risk of predetermined and necessary tolerance values being exceeded during production or when the components are fitted together or of the components being aligned in a non-precise manner with respect to one another is reduced. All in all, the plug-in connector as claimed n the invention is designed in a simple manner and is consequently less susceptible to faults during production and to faulty operation during the use of a plug-in connector.

The individual housing parts or components are preferably produced from plastics material and, for example, are produced by means of an injection molding method. This means that the components can be produced in large quantities in a cost-effective manner.

The basic body can be realized in a sleeve-like manner and advantageously can have an outer circumference with a rectangular cross section such that four outside faces are produced which can have different functionalities. For example, there can be an unlocking body of an above-mentioned locking system for unlocking the plug-in connector from a plug-in connection, said unlocking body surrounding the basic body and being mounted on the outer circumference of the basic body so as to be movable in relation to said basic body. An outside face of the basic body, for example, can have stop faces or ramps which cooperate with the unlocking body. In principle, however, an unlocking device could be provided directly on an outside face of the basic body, for example as a resiliently realized locking arm. The plug-in connector can be provided, for example, as an LC or an SC connector.

The inside circumference of the basic body can essentially have a round cross section or can also be realized only in regions with a round cross section, at least one guiding face, which serves for guiding and for aligning the conductor holder in relation to the basic body, preferably being realized in one region of the inside circumference. In the case of one embodiment, a guide for the conductor holder has several guiding faces such that an inside circumferential region is produced with a polygonal, e.g. rectangular cross section. In a corresponding manner, complementary guiding faces, which abut slidingly against the guiding faces of the basic body, are realized on the conductor holder. The guiding faces of the basic body and of the conductor holder together form a guiding device.

The basic body has at least one limit stop which is realized, for example, protruding radially inward and with which at least one radially outwardly protruding feed stop of the conductor holder cooperates when the conductor holder is in the feed position in relation to the basic body. In the feed position the conductor holder is displaced as fast as possible in the plug-in direction in relation to the basic body. As a rule, the conductor holder projects out of the basic body in the feed position. From said position, the conductor holder is movable in relation to the basic body in opposition to the plug-in direction in which the plug-in connector is plugged-in, and in relation to the basic body in opposition to the force of the spring. The necessary contact force can be built-up as a result when the plug-in connector is plugged-in. The conductor holder can be inserted into the basic body as far as up to an insertion position in which it strikes against a plug-in stop. The anti-kink element preferably forms a plug-in stop against which the conductor holder strikes in the insertion position, or the plug-in stop is realized on the anti-kink element.

As claimed in the invention, the basic body is directly connected or can be directly connected to the anti-kink element. No further intermediate components are required to connect the basic body to the anti-kink element. The anti-kink element is preferably realized in the form of a sleeve and has a through-channel, in which the conductor holder is accommodated in part, the conductor holder being movable in the axial direction inside the through-channel. The anti-kink element preferably has an inside, or outside circumferential face which is realized in a corresponding manner to the outside, or inside circumferential face of the basic body in order to be able to enter into a positive locking connection with said basic body. For example, the anti-kink element has a rectangular cross section which is slightly larger or smaller than a rectangular cross section of the basic body such that the anti-kink element and the basic body can enter into a plug-in connection. The rectangular development, in this case, also makes possible a precise alignment of a rotational position of the basic body in relation to the anti-kink element about a common longitudinal axis as the plug-in connection is possible only in a certain rotational position. In principle, the basic body can also be inserted over the anti-kink element or into the anti-kink element and it is also possible for the corresponding circumferential faces not to be rectangular in form, being, for instance, circumferential faces with a round or oval cross section. The basic body and the anti-kink element can also be provided with a locking connection in order to connect said two components together. For this purpose at least one locking cam or one or several locking ribs can be realized on the basic body, or on the anti-kink element and, in a matching manner hereto, at least one locking indentation, an opening or several locking counter ribs can be realized on the anti-kink element, or on the basic body. Through the flexibility of the plastics material components, these can be fitted into one another and can lock through the relaxation of the plastics material. A snap-type or screw connection or a friction-locking connection can also be provided. The basic body and the anti-kink element are fixedly connected together by the connection at least in such a manner that they are not released from one another through the action of the spring force, but rather the spring force is transferred from the anti-kink element to the basic body. In an advantageous manner a guide, which aligns the two components with respect to one another when they are fitted together and guides them in their provided position, is provided between the basic body and the anti-kink element. As a guide, either the basic body or the anti-kink element has a guide groove or channel, into which a guide cam or guide pin on the other of either the basic body or the anti-kink element engages and is movable therein in a guided manner.

To accommodate the spring element between the conductor holder and the anti-kink element, the anti-kink element has a spring stop and the conductor holder has a counter spring stop. The spring element is inserted between said stops such that a first and a second end of the spring element cooperate with the stops. A front face of the anti-kink element preferably forms the spring stop. This means that the spring element strikes against a substantially radially extending front side of the sleeve-shaped anti-kink element which lies axially opposite the spring element. In principle, the spring stop can also be provided, for example, by a protruding projection on an axially extending face of the anti-kink element. The counter spring stop on the conductor holder is realized, for example, as a radially outwardly protruding projection or shoulder on the outside circumference of the conductor holder.

The spring element is preferably realized as a helical spring which comes to rest around the conductor holder and is movable on the same. However, other spring elements, such as, for example, a type of leaf spring or an elastic material, for instance rubber, can also be used. In the feed position of the conductor holder, the spring element is prestressed slightly between the conductor holder and the anti-kink element and holds the conductor holder in the feed position in relation to the basic body. In principle, the spring element can also be provided in said feed position without any prestressing as long as the spring element abuts against the conductor holder and against the anti-kink element such that it can hold the conductor holder in an idle position in relation to the basic body. When the conductor holder is inserted into the basic body, the spring element is compressed until the conductor holder strikes against the plug-in stop. In this case, the spring element can be completely compressed. In the event of a helical spring, the spring spirals then come to rest one on top of another. The plug-in stop for the conductor holder consequently forms the spring stop for the spring element at the same time. The design of the anti-kink element can be simplified as a result.

In a preferred embodiment the through-passage of the anti-kink element is formed by a channel tube which is formed in the interior of the anti-kink element and has a circular cross section. The channel tube can consequently serve as a guide for the tubular conductor holder along the longitudinal axis of the plug-in connector. The channel tube can be conical and can taper in the direction of the cable end of the plug-in connector. In a preferred embodiment, the anti-kink element has a wall which surrounds the channel tube as an outside sleeve region such that a space is produced in the circumferential direction between the channel tube and the wall. When fitting the basic body and the anti-kink element together, one end of the basic body can consequently be accommodated between the wall and the channel tube of the anti-kink element. The wall, in this case, preferably has the identical cross-sectional form as the basic body and enters into a plug-in or locking connection with the basic body. For this reason the above-described locking devices can be arranged on the wall. The channel tube lying inside the wall preferably includes the plug-in stop for the conductor holder, the front side of the channel tube being able to serve as a stop. In the event of a spring element in the form of a helical spring, the diameter of the channel tube advantageously corresponds substantially to a diameter of the helical spring. The front face of the channel tube can consequently serve as a spring stop.

The conductor holder is preferably constructed from a ferrule, a ferrule holder and a ferrule extension which projects into the anti-kink element, for example into the through-channel. Such a conductor holder corresponds to the usual designs for holding a conductor inside the plug-in connector such that conventional conductor and cable systems can be used for the plug-in connector as claimed in the invention. The ferrule, in this case, can consist of plastics material, metal, ceramic or the like. The ferrule holder preferably has part of the guiding device for guiding the conductor holder inside the basic body, for example, the ferrule holder is polygonal with guiding faces which abut against counter guiding faces on the basic body. Consequently, precise guiding can be achieved when inserting the conductor holder in opposition to the spring force.

In one embodiment of the plug-in connector, the cable, from which the conductor exits and is accommodated by the conductor holder, or the ferrule, can be secured on the anti-kink element or on the basic body. The cable is preferably connected to the anti-kink element. A clamping sleeve or crimping sleeve, which clamps the cable on the anti-kink element, can be provided for this purpose. The clamping sleeve, in this case, preferably comes to lie in part inside the anti-kink element and can protrude in part into the flexible, pliable region of the anti-kink element. In principle, the cable, or the cable sheath, can also be fastened to the basic body.

By means of the number of components reduced compared to the prior art and the multi-functional use of the present components, the plug-in connector as claimed in the invention can be produced in a cost-effective and rapid manner. At the same time, a high level of precision can be achieved to meet the necessary standards.

BRIEF DESCRIPTION OF THE DRAWINGS

Preferred embodiments of the invention are shown below by way of the drawings which serve purely for explanation and are not to be seen as restricting. Features of the invention becoming obvious from the drawings are to be viewed individually and in any combination as belonging to the disclosure of the invention. The drawings are as follows.

DETAILED DESCRIPTION OF THE INVENTION

A plug-in end shown on the left-hand side in the figures, by way of which the plug-in connector can be inserted into a further connection piece (not shown), designates a front end of the plug-in connector. A cable end shown on the right-hand side, from which a conductor cable protrudes out of the plug-in connector, designates a rear end. A longitudinal axis L extends centrally through the plug-in connector.

Figure 1:
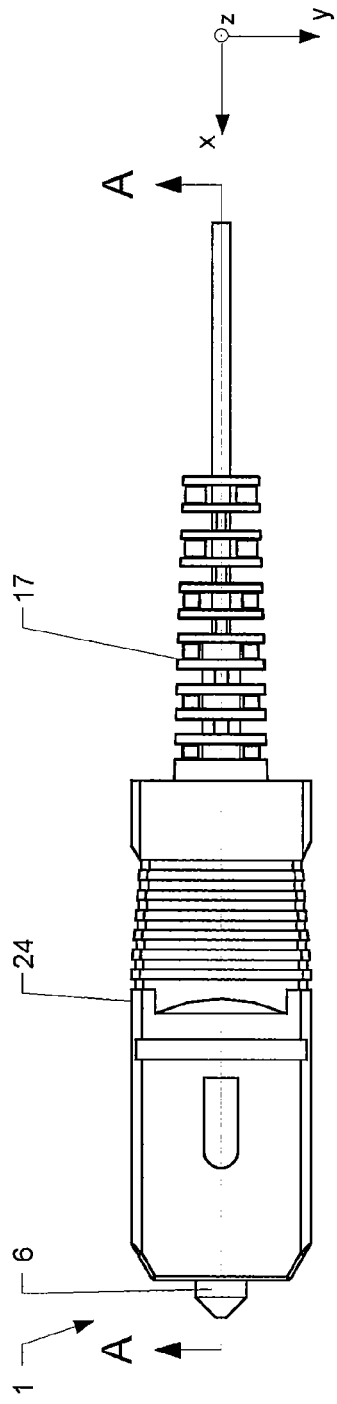
FIG. 1 shows a longitudinal view of a plug-in connector as claimed in the invention.

FIG. 1 shows a view of a plug-in connector 1 as claimed in the invention in the manner of an SC connector. An unlocking body 24, which serves as a type of housing for a basic body 2, an anti-kink element 4 and a spring element 5, can be seen in the figure. At the front end a ferrule 6 projects out of the unlocking body 1 and the basic body. A bending region 17 of the anti-kink element exits at the rear end and surrounds a conductor cable.

The unlocking body 24 can cooperate by way of a locking device with a further plug-in connector, for example of a device of another conductor, and can lock the plug-in connector 1 to the further plug-in connector in order to secure the connection of the conductor. The locking device is preferably realized so as to be releasable. To release the plug-in connector from the connection to the further plug-in connector, the unlocking body 24 can be moved, in particular pushed, in relation to the basic body 2 and to the anti-kink element 4, as a result of which the locking device is released.

Figure 2:
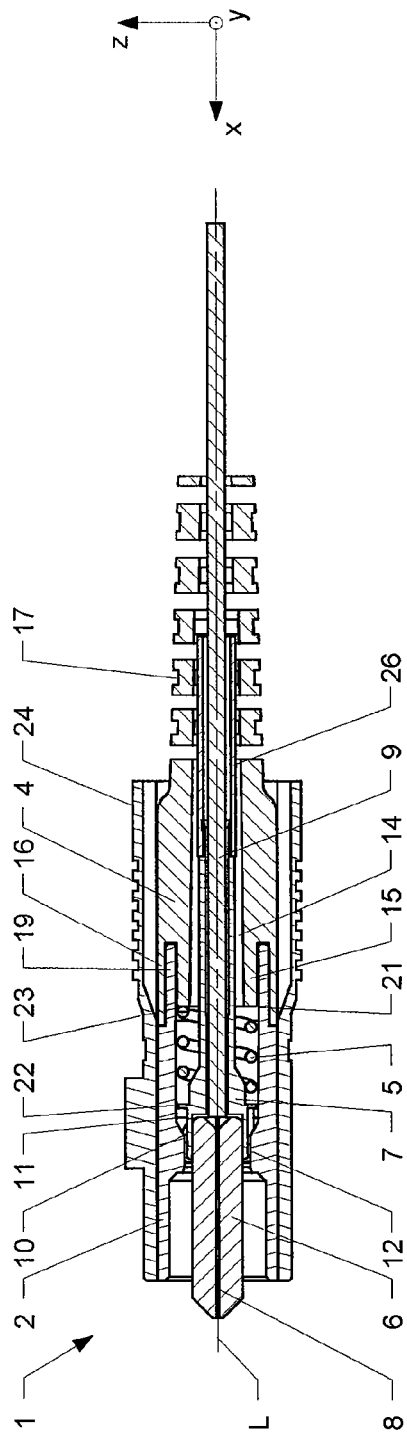
FIG. 2 shows a longitudinal section through the plug-in connector as claimed in the invention and FIG. 3 shows an exploded view of the plug-in connector as claimed in the invention.
Figure 3:
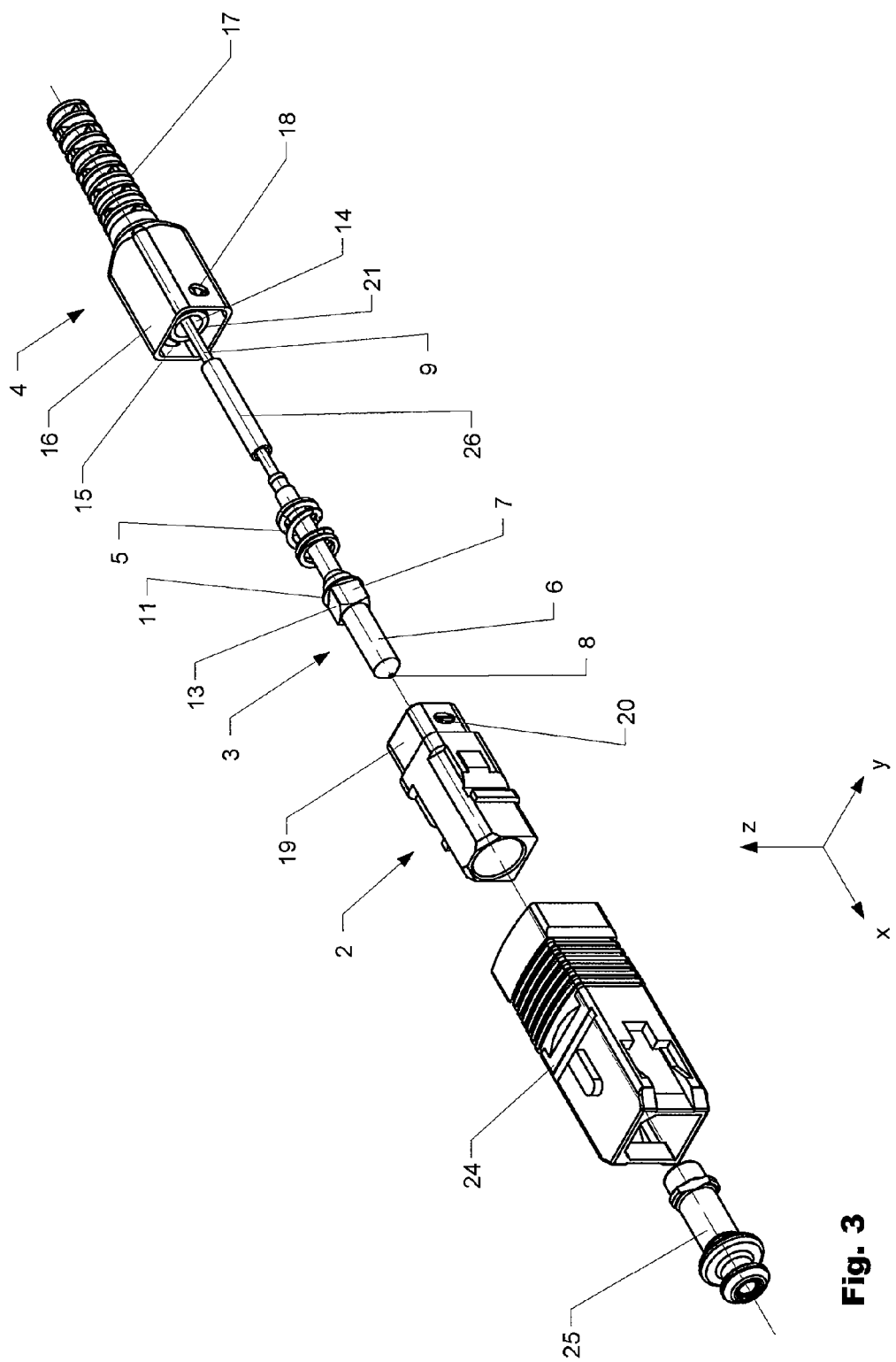

The sleeve-like basic body 2 with a through-opening, a tubular conductor holder 3 and the anti-kink element 4 can be seen in FIGS. 2 and 3. The spring element 5 is inserted between the conductor holder 3 and the anti-kink element 4. The conductor holder 3 includes a ferrule 6 and a ferrule holder 7 with an axial extension in the direction of the cable end. A conductor 8, for example an optical fiber which exits from a conductor guiding tube 9, is arranged inside the ferrule 6. A cable sheath (not shown) can be provided around the conductor guiding tube 9.

The basic body 2 has a radially inwardly protruding limit stop 10 which is preferably integrally molded on the basic body, or is integrally molded from the same. In a complementary manner to the limit stop 10, the conductor holder 3 has a radially outwardly protruding feed stop 11, by way of which the conductor holder 3, in the insertion direction, strikes against the limit stop 10 in the axial direction. The feed stop 11 is provided, for example, by means of an edge on the ferrule holder 7. In addition, in a region of the inside circumference, the basic body 2 has a polygonal cross section, in the example shown a four-cornered cross section. The region is realized by inside guiding faces 12 on the inside circumference. In a manner matching hereto, outside guiding faces 13 are provided on the conductor holder 3 on a region of the outside circumference. If the conductor holder 3 is inserted into the basic body 2, the outside guiding faces 13 come to lie on the inside guiding faces 12 such that the conductor holder 3 is aligned in relation to the basic body 2 and is secured against rotation about the longitudinal axis L in relation to the basic body 2. The inside and outside guiding faces 12 and 13 preferably have an axial length in such a manner that the conductor holder 3 remains guided by said faces over the entire possible displacement path inside the basic body. Consequently, the inside and outside guiding faces 12 and 13 together form a guiding device on the basic body 2 and on the conductor holder 3.

The anti-kink element 4 has axially a through channel 14, through which the conductor 8 is guided and in which the conductor holder 3 is arranged in part. The anti-kink element has a channel tube 15, which extends concentrically about the center axis and surrounds the through channel 14. As can be seen in FIG. 1, the through-channel is conical and is tapered in the direction of the cable end of the plug-in connector. In principle, the through-channel can also be cylindrical. A wall 16 is provided around the channel tube 15, said wall being rectangular in cross section. The channel tube 15 and the wall 16 protrude from a base body of the anti-kink element in the axial direction and are arranged concentrically with respect to one another. A space is realized between the channel tube 15 and the wall 16. At the end opposite the wall 16 and the channel tube 15, the anti-kink element 4 has a bending region 17 which can be bent in a flexible manner from the axial basic position, as is known from the prior art. At least on one circumferential face, the wall 16 has a locking opening 18 which serves for a locking connection between the basic body 2 and the anti-kink element 4.

In the direction of the anti-kink element 4, the basic body 2 has an outside circumferential region 19 which is realized in a complementary manner to the wall 16 in order to be able to enter into a connection with said wall. Consequently, the outside circumferential region 19 also has a rectangular cross section, but with a slightly smaller diameter than the wall 16. A locking cam 20, which can lock with the locking opening 18 of the anti-kink element 4, is arranged on the outside surface of the circumferential region 19.

The basic body 2 and the anti-kink element 4 are directly connected together by the outside circumferential region 19 of the basic body 2 being introduced into the space between the channel tube 15 and the wall 16 until the locking cam 20 snaps into the locking opening 18. The basic body 2 and the anti-kink element 4, as a result, are connected together by means of a locking connection. In addition, a radially extending edge on the basic body 2 can strike against the front side of the wall 16 when the basic body 2 and the anti-kink element 4 are completely telescoped. In principle, the connection between the basic body 2 and the anti-kink element 4 is provided so as to be non-releasable. If desired, however, the connection can also be developed so as to be releasable.

The anti-kink element 4 has a spring stop 21 against which a first end of the spring element 5 abuts. The spring stop 21 can preferably be formed by a front face of the anti-kink element 4, in particular by a front face of the channel tube 15. Any face of the anti-kink element which extends radially with respect to the longitudinal axis L and at which the anti-kink element 4 ends in the direction of the plug-in end of the plug-in connector is defined as a front face. The conductor holder 3 has a counter spring stop 22 which protrudes radially outward. The counter spring stop 22 is preferably provided on the ferrule holder 7. For example, the ferrule holder 7 can have a type of radially revolving disk body, the side of which pointing to the plug-in end serving as limit stop 10 and the side of which pointing to the cable end serving as counter spring stop 22. The disk body with the limit stop 10 and the counter spring stop 22 is preferably provided behind the outside guiding faces 13.

The spring element 5 in the exemplary embodiment shown is realized as a helical spring which surrounds the conductor holder 3. The diameter of the channel tube 15 is matched to the diameter of the helical spring such that said helical spring by way of its first end comes to rest against the front face of the channel tube 15, which forms the spring stop 21. The second end of the spring element 5 abuts against the counter spring stop 22. FIG. 2 shows the plug-in connector 1 in a feed position of the conductor holder 3 in relation to the basic body 2. In said position, the spring element 5 is slightly prestressed and presses the feed stop 11 of the conductor holder 3 against the limit stop 10 of the basic body 2. The conductor holder 3 can be displaced in an axial manner in opposition to the force of the spring element 5 in relation to the basic body 2 and in relation to the anti-kink element 4, the spring force being transferred from the anti-kink element 4 via the locking connection 18, 20 to the basic body. The conductor holder 3 can be pushed in so far until it strikes against a feed stop 23 on the anti-kink element 4. The feed stop 23 in the exemplary embodiment shown is also formed by the front face of the channel tube 15. The conductor holder 3 can be displaced so far until the spirals of the helical spring come to rest one on top of another and strike against the feed stop 23. The displacement path of the conductor holder 3 is consequently defined by the axial distance between the limit stop 10 on the basic body 2 and the feed stop 23 on the anti-kink element 4.

During production of the plug-in connector 1, the spring element 5, for example, is pushed from behind over the extension of the ferrule holder 7 until it strikes against the counter spring stop 22. The ferrule holder 7 with the ferrule 6 is then inserted into the basic body 2 until the inside guiding faces 12 of the basic body slide along on the outside guiding faces 13 of the ferrule holder and the feed stop 11 of the ferrule holder 7 strikes against the limit stop 10 of the basic body 2. The anti-kink element 4 with the wall 16 is then pushed over the outside circumferential region 19 until the locking cam 20 snaps into the locking opening 18. In this case, a guide sleeve 26 can serve as an insertion aid. In principle, however, this is not absolutely necessary. At the same time, the spring element 5 is pressed against the spring stop 21 and the spring element 5 is prestressed a small amount. In the case of a plug-in connector as claimed in the present invention, no further intermediate elements have to be positioned and fastened between the basic body 2 and the anti-kink element 4.

A protective cap 25, which can be placed onto the ferrule 6 in order to protect the conductor 8, can be provided when the plug-in connector is not inserted.

The invention claimed is:

1. A plug-in connector for connecting at least one conductor (8), said plug-in connector including:
    a body (2) with a continuous opening and a limit stop (10),
    at least one tubular conductor holder (3) which is arranged at least in part inside the body (2) and is mounted in said body so as to be movable, wherein in a feed position of the conductor holder (3) a feed stop (11) of the conductor holder (3) cooperates with the limit stop (10),
    an anti-kink element (4) comprising a sleeve which is arranged around a conductor (8) and protrudes at least in part in an axial manner over the body (2), the anti-kink element (4) including a wall (16) disposed around a channel tube (15) and a through-channel (14) within the channel tube (15), wherein the through-channel (14) accommodates the conductor holder (3) in part therein,
    at least one spring element (5) for positioning the conductor in relation to the body (2), and
    the at least one spring element (5) is clamped between the conductor holder (3) and the anti-kink element (4), wherein the anti-kink element (4) and the body (2) are operatively connected in a mechanical manner and serve for transferring the force of the spring element (5), wherein the body (2) and the anti-kink element (4) are so formed that an outside circumferential region (19) of the body (2) is introduced into a space between the channel tube (15) and the wall (16) of the anti-kink element (4).

2. The plug-in connector as claimed in claim 1, wherein the anti-kink element (4) forms a spring stop (21), with which a first end of the spring element (5) cooperates.

3. The plug-in connector as claimed in claim 2, wherein a front face of the anti-kink element (4) forms the spring stop (21).

4. The plug-in connector as claimed in claim 1, wherein the conductor holder (3) includes a radially outwardly protruding counter spring stop (22) with which a second end of the spring element (5) cooperates.

5. The plug-in connector as claimed in claim 1, wherein in a mounted state, the body (2) is directly operatively connected to the anti-kink element (4).

6. The plug-in connector as claimed in claim 1, wherein in a mounted state, the body (2) and the anti-kink element (4) are operatively connected by way of a locking connection (18, 20).

7. The plug-in connector as claimed in claim 1, further comprising a guiding device (12, 13), for aligning the body (2) and the anti-kink element (4) with respect to one another, is positioned with respect to the body (2) and on the anti-kink element (4).

8. The plug-in connector as claimed in claim 1, wherein the feed stop (11) of the conductor holder (3) is formed to protrude radially outwardly and the limit stop (10) of the body (2) is formed to extend radially inwardly.

9. The plug-in connector as claimed in claim 1, wherein the anti-kink element (4) forms a plug-in stop (23) in a plug-in position in which the conductor holder (3) is plugged into the body (2) in opposition to the force of the spring element (5).

10. The plug-in connector as claimed in claim 1, wherein the spring element (5) comprises a helical spring which is arranged around the conductor holder (3).

11. The plug-in connector as claimed in claim 1, wherein the through-channel (14) is formed by the channel tube (15) positioned in the interior of the anti-kink element (4).

12. The plug-in connector as claimed in claim 11, wherein the channel tube (15) of the anti-kink element (4) is conical.

13. The plug-in connector as claimed in claim 11, wherein the diameter of the channel tube (15) corresponds substantially to a diameter of the helical spring.

14. The plug-in connector as claimed in claim 11, wherein the wall (16) of the anti-kink element (4) surrounds the channel tube (15) and one end of the body (2) is accommodated in the anti-kink element (4) between the wall (16) and the channel tube (15).

15. The plug-in connector as claimed in claim 1, wherein the conductor holder (3) includes a ferrule (6), a ferrule holder (7) and a ferrule extension which projects into the anti-kink element (4).

16. The plug-in connector as claimed in claim 1, wherein an unlocking body (24), which surrounds at least the body (2) and is mounted so as to be movable in relation to said basic body, is provided for unlocking the plug-in connector (1) from a plug-in connection.

\* \* \* \* \*